United States Patent [19]

Anttonen

[11] Patent Number: 4,976,762
[45] Date of Patent: Dec. 11, 1990

[54] METHOD AND APPARATUS FOR BENDING AND TEMPERING A GLASS SHEET

[75] Inventor: Kauko K. Anttonen, Tampere, Finland

[73] Assignee: Tamglass Oy, Tampere, Finland

[21] Appl. No.: 426,864

[22] Filed: Oct. 26, 1989

[30] Foreign Application Priority Data

Sep. 4, 1989 [FI] Finland .................................. 894147

[51] Int. Cl.$^5$ ........................................... C03B 23/027
[52] U.S. Cl. ........................................ 65/107; 65/289; 65/290; 65/291; 65/361
[58] Field of Search .......... 65/104, 106, 107, 288–291, 65/351, 361

[56] References Cited

U.S. PATENT DOCUMENTS

| | | |
|---|---|---|
| 2,223,124 | 11/1940 | Owen . |
| 2,677,918 | 5/1954 | Bird et al. . |
| 3,361,552 | 1/1968 | Ritter, Jr. . |
| 3,529,947 | 9/1970 | Frank . |
| 3,545,951 | 12/1970 | Nedelec . |
| 3,881,906 | 5/1975 | Ritter et al. ...................... 65/106 X |
| 4,123,246 | 10/1978 | Johnson . |
| 4,139,359 | 2/1979 | Johnson et al. . |
| 4,292,065 | 9/1981 | Nedelec et al. . |
| 4,381,933 | 5/1983 | Schultz et al. . |
| 4,540,425 | 9/1985 | Bocelli et al. . |
| 4,540,426 | 9/1985 | Bocelli et al. ...................... 65/104 X |
| 4,773,925 | 9/1988 | Schultz . |
| 4,784,681 | 11/1988 | McMaster . |
| 4,820,327 | 4/1989 | Letemps et al. ...................... 65/104 |
| 4,822,398 | 4/1989 | McMaster et al. . |
| 4,881,962 | 11/1989 | Reunamäki et al. .............. 65/107 X |

FOREIGN PATENT DOCUMENTS

| | | |
|---|---|---|
| 3525451 | 2/1987 | European Pat. Off. . |
| 0154892 | 6/1988 | Fed. Rep. of Germany . |
| 4321654 | 10/1963 | Japan . |

Primary Examiner—Robert L. Lindsay
Attorney, Agent, or Firm—Burns, Doane, Swecker & Mathis

[57] ABSTRACT

The invention relates to a method and apparatus for bending and tempering a glass sheet. A heated glass sheet is carried from a furnace onto a conveyor in a bending and tempering section, said conveyor comprising a plurality of individual conveyors in the form of an endless belt or caterpillar track. The conveyor serves as a bending mould, a transfer conveyor and a tempering support. A glass sheet is bent by pivoting the body structures (6) of individual conveyors relative to each other in a manner that the lower runs of individual conveyors pull away from each other in lateral direction while, at the same time, the upper conveyor runs are bending to an arched shape. The chilling blast for bent glass is effected through openings (17, 18) in the halted conveyor.

30 Claims, 5 Drawing Sheets

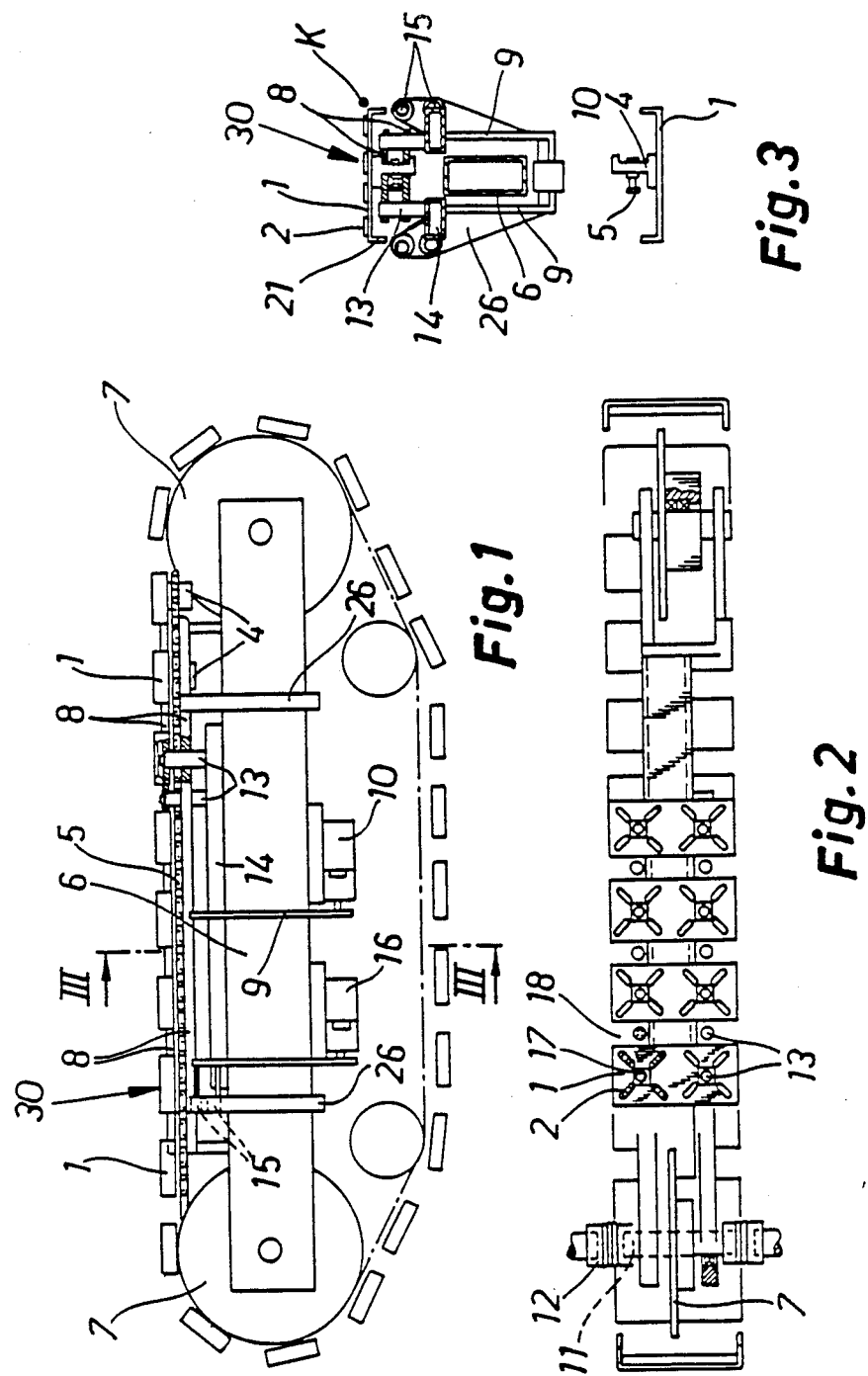

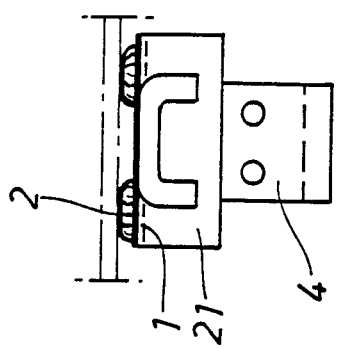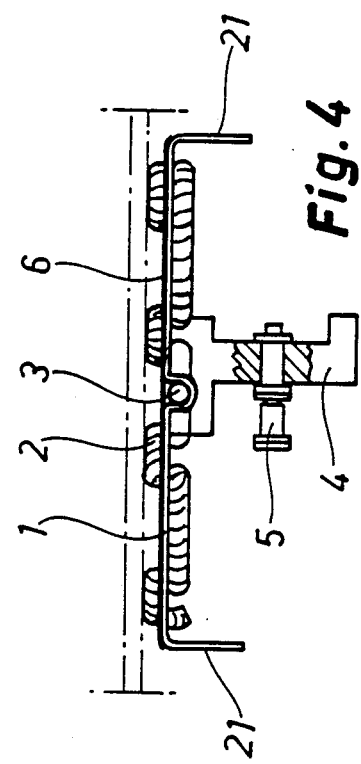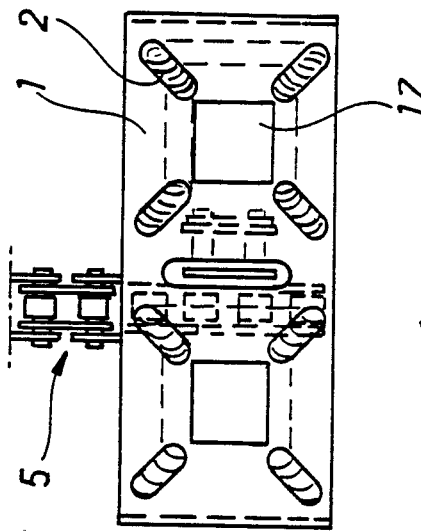

METHOD AND APPARATUS FOR BENDING AND TEMPERING A GLASS SHEET

The present invention relates to a method for bending and tempering a glass sheet, wherein a glass sheet is heated in a furnace to a tempering temperature and advanced to a bending and tempering section in which the glass sheet is carried on a support, the bearing surface configuration of said support being transformed from a substantially flat shape to a shape matching the desired curvature and, at least at the final stage of curving, a pressure effect is applied to the upper surface of a glass sheet at least locally to those parts which have not conformed to the shape of the bearing surface as a result of gravity.

The invention relates also to a glass bending and tempering apparatus, comprising:
  a glass sheet bearing support, which serves as a bending mould, a moving conveyor and a tempering support, the shape of its bearing surface being transformable from a substantially flat shape to a shape matching the desired curvature,
  a press surface above the bearing support which can be made to substantially match said curved shape of the bearing surface, and
  cooling air blastheads on either side of the bearing surface, adapted to direct cooling air jets to both sides of a curved glass sheet carried on the bearing surface.

The currently available equipment for bending a glass sheet in two directions and for tempering it employs moulds conforming to any given glazing closure and bending configuration. A problem with such equipment is the impossibility of running production without replacing the moulds for each type of glass and the corresponding new settings This is particularly harmful in small series and mixed production since production cuts lead to reduced efficiency.

An attempt has been made to solve the problem e.g. by a method and an apparatus disclosed in U.S. Pat. No. 4,292,065, wherein the two-way bending of a glass sheet proceeds in a manner that the transverse bending is effected by means of arched rolls and the longitudinal bending by curving the path of a roll conveyor. This arrangement does not provide asymmetrical curvatures and bending cannot be effected at a very small radius of curvature. The apparatus is structurally complicated and expensive. Different parts of the surface of a two-way curved glass sheet have different speeds depending on the degree of curvature. The peripheral speed of rolls is impossible to match with the speed of glass surface over the entire length of a roll. This results in abrasion marks on glass surface and deterioration of the optical quality of glass.

An object of the invention is to provide an improved method and apparatus for the two-way bending of a glass sheet with curvatures that are freely selectable within a relatively wide range without any substantial relative movement occurring between a curved glass sheet and its bearing surface during the bending.

A particular object of the invention is to provide the above type of method and apparatus for producing bent and tempered glasses of many different configurations without glass-dictated and long setting times and test runs and, furthermore, in terms of production capacity, a method and apparatus of the invention can be readily applied also to large series production.

These objects are achieved with a method and apparatus of the invention as set forth in the claims.

In a method of the invention, a glass sheet heated to a bending temperature is carried from a furnace onto a regulation mould, contained in a bending and tempering section and consisting of a plurality of endless conveyor belts which are arranged side by side and resemble a caterpillar track in construction. The conveying and bearing surface of this caterpillar track belt consists of rather small plate-like elements which are joined by a chain or a belt. The thus formed individual tracks are joined side by side to provide an adjustable bending surface which also serves as a conveyor.

Bending a glass sheet to a smaller radius of curvature (=greater bending depth) is effected by turning the bodies of adjacent tracks relative to each other, whereby the plate-like bearing elements also turn relative to each other and, in addition, said elements are joined with each other at the edges thereof in a manner that the arching or curving thereof is proportional to the turning movment. Bending to a greater radius of curvature (=smaller bending depth) is effected in the conveyor direction by centrally bending the upper run of a conveyor formed by endless belts or tracks.

In addition to an adjustable bending mould below a glass sheet, there is preferably mounted above a glass sheet a support surface consisting of similar type of flexible plates and remaining stationary relative to the glass advancing direction, said support surface being used for gently pressing a halted glass from the concave side.

The entrance speed of a heated glass sheet from the furnace onto a bender is as fast as possible and the halting occurs at a maximum acceleration in a precisely predetermined position in a manner that the holes in the upper run of a conveyor are set in alignment with the blastheads. The adjustable bending surface of a halted conveyor is quickly arched and the overhead press surface makes sure that the glass conforms to the bent conveyor surface. This is immediately followed by a tempering blast and, after completing the tempering action, the bent conveyor surface is straightened and the bent glass sheet is driven on a conveyor to post-cooling or discharge.

Thus, in a solution of the invention, the same flexible conveyor surface serves as a conveyor, a bending mould surface and a tempering support. The bending and tempering section is located outside the furnace since the temper chilling cannot be performed in the furnace. This eliminates the need of carrying the already bent glass to a tempering location which, in turn, would require a transport mould or the like and could possibly cause distortions in the final product as a result of transport. Neither would it be a simple task to build in a hot furnace an adjustable bending mould that would fulfil the objects and purposes of the invention.

One embodiment of the invention will now be described in more detail with reference made to the accompanying drawings, in which FIG. 1 is a side view of one belt strip of a belt conveyor serving as a bending mould in an apparatus of the invention.

FIG. 2 shows the same as FIG. 1 in a plan view and

FIG. 3 shows a section along a line III—III in FIG. 1

FIGS. 4, 5 and 6 show one bearing surface element included in the belt in an end, plan and side view, respectively.

Figure 7:
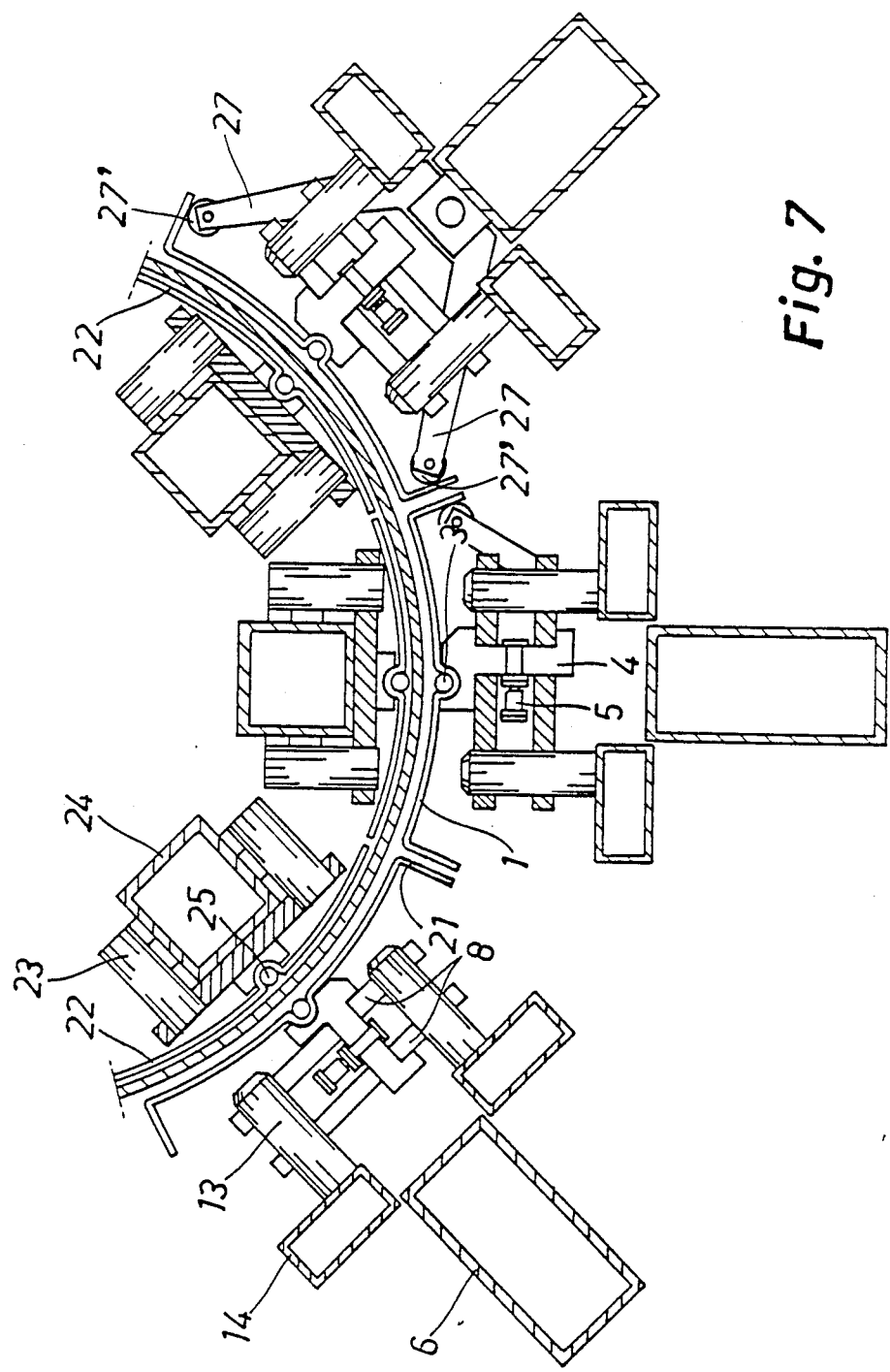
FIG. 7 shows a cross-section of an arched belt conveyor consisting of a plurality of parallel individual belt strips, which in terms of construction and supporting structures conform to the preceding figures.

First explained is the structure of an individual bearing element with reference made to FIGS. 4–6. To rather a stiff but still flexible plate 1 is fixed some braiding 2 having a low thermal conductivity, which is threaded through holes made in plate 1 and provides a plurality of bearing spots on the top surface of plate 1. The braiding can also be fastened e.g. by gluing. Braiding 2 can be made of any conventional fibers, such as glass fibers, polyamide fibers, carbon fibers etc. A glass sheet carried by braiding 2 is slightly raised from the surface of plate 1, whereby the chilling air blasted through openings 17 in plate 1 is able to spread along the surface of a glass sheet.

A flexible plate 1 is fixed by means of a chuck 3 to its stand 4. The flexible plates 1 are linked together at their stands 4 by means of an endless chain 5 to build a sort of caterpillar track assembly. Thus, the term "belt" as used in this specification is a general term for all belt-like conveyor elements, particularly including the above type of caterpillar track assembly. If necessary, the flexible plate 1 is lined with a heat resisting fabric 6. The side edges of plate 1 are folded to form downwards directed extensions 21 whose significance will be explained later.

As attached to chain 5, the above plate elements are assembled to provide an individual belt strip whose design and support are explained hereinbelow with reference made to FIGS. 1–3. The chain 5 runs as a continuous (endless) loop around wheels 7 journalled to a main beam 6. The stand 4 of flexible plate 1 is mounted on slide bars 8 which, on the other hand, are fixed at their ends to main beam 6. These slide bars 8 can be bent relative to main beam 6 by means of levers 9 engaging the central section of slide bars 8 and operated by an electric or hydraulic actuator 10. The caterpillar track, whose upper run is provided by a bending and bearing surface designated with reference numeral 30, is driven by a shaft 11 to which a torque is transmitted from the adjacent caterpillar track by way of a resilient coupling 12. The roll conveyor is provided with compressed-air nozzles 13 and delivery pipes 14 to which nozzles 13 are fixed. If necessary, pipes 14 along with their nozzles 13 can be made bendable together with slide bars 8.

The individual, parallel conveyor belt strips are coupled with each other by means of pivoting and fastening links 15 in the lugs of flanges 26 fixed to main beams 6. In the present case, each mounting includes two superimposed eccentric fastening links 15, which are simultaneously rotated in a certain manner for selecting the location of the axis of rotation K between adjacent elements. If a single pivot link were used, the axis of rotation would be in alignment with the pivot link. By using two eccentric fastening and pivot links 15, it has been possible to locate the axis of rotation K between adjacent main beams 6 flush with the glass bearing surface. A result of this is that, as the bearing surface is in the process of curving, there will be no lateral displacement between that surface and glass. The rotation of eccentric links 15 and simultaneously the relative rotation of adjacent main beams 6 can be adjusted or set by means of an actuator 16. It is obvious that the turning motion of individual conveyors can also be achieved with other type of mechanisms which combine rotation and displacement in a manner that the axis of rotation K will be flush with the glass bearing surface.

Figure 8:
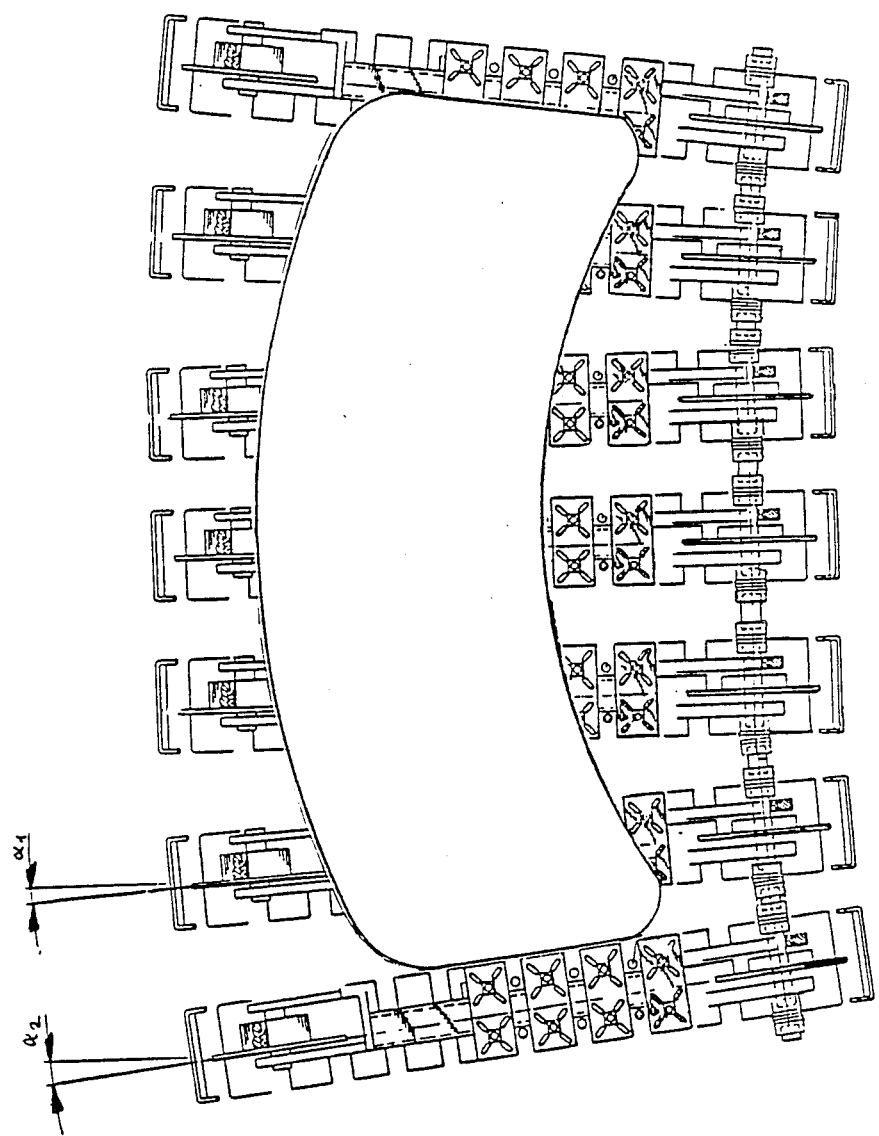
FIG. 8 shows a plan view of a bending conveyor comprising individual conveyors shown in FIGS. 1–3 and applied to a case, wherein different parts of a glass sheet are bent around bending axes extending in different directions relative to each other.

FIG. 7 illustrates a glass sheet bent transversely to a continuous arch. Bending has been achieved by turning or rotating the bodies 6 of parallel individual belt strips relative to each other, whereby the lower runs of belt strips have pulled away from each other in lateral direction while the upper belt runs have bent (as viewed in cross-section) to an arch. The arching of flexible plate element 1 has been accomplished by maintaining the edges of adjacent elements at a constant distance from each other. In the present case this has been effected by fitting the body 6 with arms 27, provided with press rollers 27' and adapted to turn relative to each other (to pull away from each other in each pair fastened to the same body) in the same proportion as bodies 6 are turning relative to each other. The pivoting motion of arms 27 can be positively transmitted from the pivoting mechanism of bodies 6 by means of gears and shafts (not shown). When peripheral extensions 21 are pressed this way, no mechanical coupling is required between individual conveyors. Thus, it is also possible to swing adjacent individual conveyors in the horizontal plane to an angle $\alpha(\alpha_1, \alpha_2 \ldots)$, as shown in FIG. 8. This makes it possible to bend such glasses, in which the radii of bending form an angle relative to each other. Typical examples of such glazings are vehicle backlights.

The possibility of angular pivoting shown in FIG. 8 is preferably provided for the outermost individual conveyors which are already pre-turned to an angle and lie slightly below the bottom surface level of glass upon receiving a glazing to be bent onto a bender.

In the case shown in FIG. 7, all body sections 6 have been rotated over the same distance relative to each other. If just one of the outermost body sections had been rotated relative to the center one, the result would be one half of a glass sheet being flat and one end of the central conveyor plate element 1 being straight all the way to the point of coupling 3. Thus, the degree of rotation of bodies 6 of belt strips is freely selectable and, hence, the shape of transverse bending is also freely selectable. FIG. 7 also shows that chilling air blastheads 13 follow the rotating movement of bodies or main beams 6. It is inevitable to have blastheads 13 follow the glass bending shape in the direction of a small radius of bending in order to effect the chilling or tempering blast from a position sufficiently close to glass surface. Prior to the commencement of a chilling blast, the bending conveyor is stopped at a predetermined position, wherein the chilling blastheads 13 mounted on body 6, 14 will be in alignment with openings 17 or gaps 18 in plates 1.

Above the lower mould conveyor there is a support surface, which is also fabricated from flexible plates 22 and which, in the present case, is not designed as a conveyor but remains stationary relative to the glass direction of travel. Of course, the overhead support surface can also be designed as a conveyor or the overhead press can be provided with rollers, whereby the bending of glass can already be effected during the advance movement. In vertical direction, this support surface is movable for gently pressing a halted glass sheet on the concave side thereof. The flexible plates 22 are at mounting points 25 fastened to a main pipe 24 which at the same time provides a cooling air inlet duct provided with overhead blastheads 23. The plates 22 include holes in alignment with blastheads 23 and/or the blastheads 23 are aligned with gaps between plates 22. The main beams 24 can either be forcedly turned along with the rotating motion of main beams 6 or as guided by the configuration of the top glass surface when the overhead presses meet with glass surface The overhead presses 22 can be pre-biased with a spring loading for applying a constant pressure to the top surface of a glass sheet at least in those parts which have not conformed to the configuration of the lower mould surface.

Figure 9:
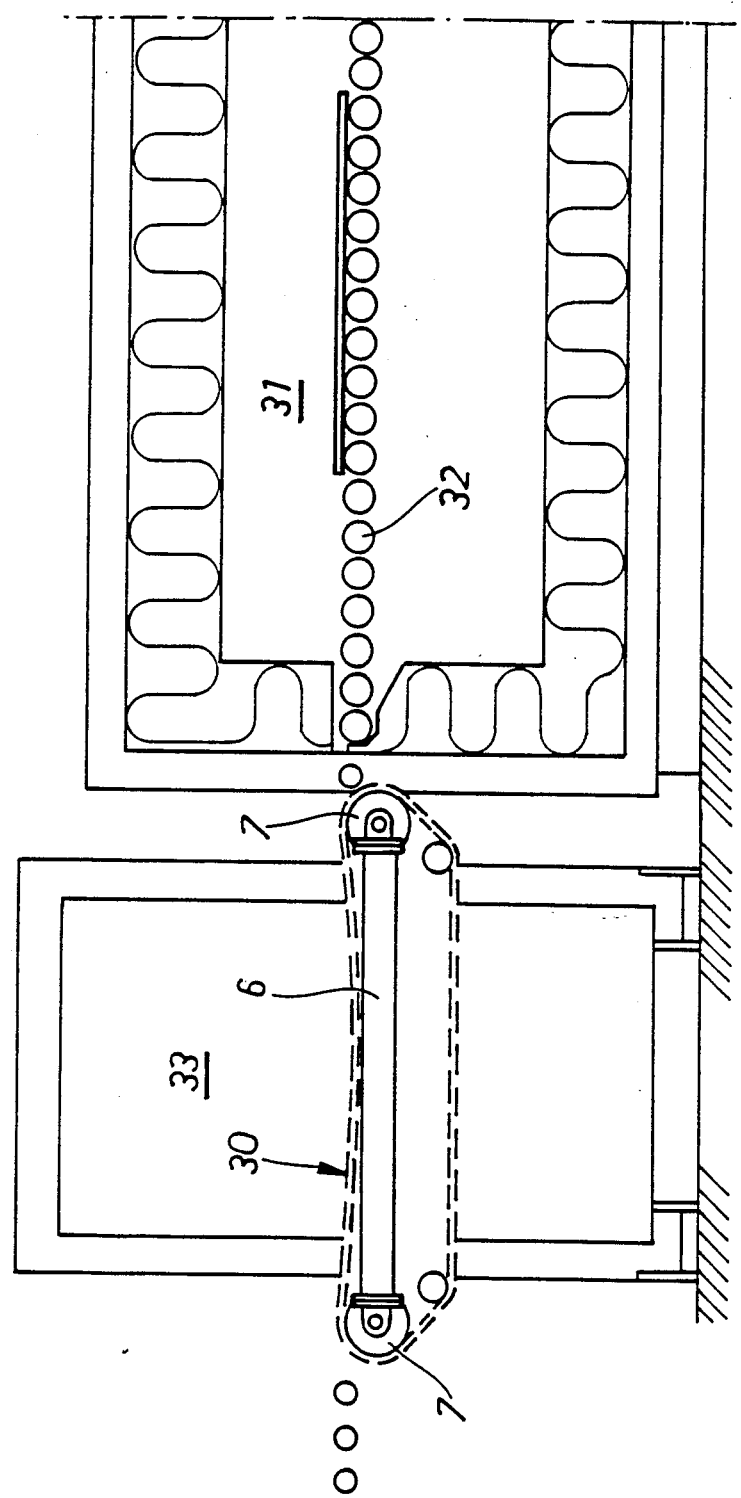
FIG. 9 is a schematic vertical section showing an apparatus of the invention fitted in a bending and tempering section following the furnace.

FIG. 9 illustrates the advancing of a glass sheet heated in a furnace 31 on furnace conveyor rolls 32 onto a conveyor mould surface 30 in a bending and tempering section 33 downstream of the furnace, the longitudinal arching of said surface producing a bending in the advancing direction around a bending axis transverse to the advancing direction. This bending is effected at a substantially larger radius of bending than the bending shown in FIG. 7 around a bending axis in the advancing direction. Downstream of bending and tempering section 33 may be provided a separate cooling section, into which a glass sheet can be carried from section 33 as soon as the chilling or tempering is completed. This provides a maximum use of the capacity of the apparatus. In view of this, it is preferable to adapt the advance of glass sheets on roll conveyor 32 of furnace 31 to proceed in a semi-continuous fashion in a manner that, rotating rolls 32 back and forth, the successive glass sheets are reciprocated so that the moving distance forward is slightly longer than backward.

Naturally, the invention is by no means limited to the above-described example but its structural embodiments can be modified in many ways. Thus, for example, the chilling air to blastheads 13 can be supplied through a duct provided by main beam 6, so the separate pipes 14 are not needed. The bearing elements formed by flexible plates 1 and braidings 2 can be built as double-component elements in a manner that, during the advancing and bending, a glass sheet is carried on flat lined plates 1 to provide a large bearing surface and not until at the chilling blast stage are the actual carrier braidings 2 lifted up through the opening of these plates 1 for raising the glass off the bearing surface to provide a discharge duct for chilling air. Also the overhead press elements can be embodied in many different ways. Instead of plates 22 it is even possible to employ a plurality of separately springed finger-shaped press elements. Instead of a spring arrangement, the shape of overhead press elements can be pre-set in compliance with the lower mould surface, whereby the overhead press surface only touches the glass on its concave side when the shape of glass differs from that of the lower mould surface to the extent which exceeds a predetermined tolerance range.

I claim:

1. A method for bending and tempering a glass sheet comprising the steps of:

heating a glass sheet in a furnace to a tempering temperature, conveying said glass sheet into a bending and tempering section on a bearing support surface wherein said bearing support surface comprises an upper run of an endless belt conveyor, said endless belt conveyor including a plurality of individual belt strip segments that are pivotally adjustable relative to each other such that each of said plurality of individual belt strip segments is inclined relative to an adjacent belt strip segment after pivotal adjustment, bending the upper run of said endless belt conveyor so as to change said upper run from a substantially flat shape to a shape having a desired curvature wherein said upper run is bent at least around a bending axis extending in a glass sheet advancing direction by pivoting said plurality of individual belt strip segments relative to each other, said bending providing an upper run such that a central region of said upper run is positioned at a level different from a level of at least one side region of said upper fun, and, blasting at least one of the bottom and top surfaces of said glass sheet carried by the upper belt run with chilling air.

2. A method as set forth in claim 1, wherein, following the bending, upper run supporting structures are moved so as to return the upper run to a substantially flat shape and the belt conveyor is advanced so as to carry a bent glass sheet out of the bending and tempering section.

3. A method as set forth in claim 1, wherein prior to bending of the upper run the belt conveyor is halted in a predetermined position and wherein after bending of the upper run, a press surface mounted above the upper runs is pressed down to secure the bending of a glass sheet to a shape matching that of the belt conveyor.

4. A method as set forth in claim 1, wherein prior to bending of the upper run, the belt is stopped at a predetermined position and chilling blastheads fastened to a belt-supporting body below the supper run are in alignment with openings in the belt conveyor.

5. A glass bending and tempering apparatus, comprising:

a glass sheet bearing support serving as a bending mould, a transfer conveyor and a tempering bed, said bearing support having a bearing surface transformable from a substantially flat shape to a shape having a desired curvature, a press surface disposed above the bearing support wherein said press surface is transformable to a shape that substantially matches said desired curvature of said bearing surface, chilling air blastheads for directing chilling air jets to bottom and top surfaces of a curved glass sheet carried by the bearing surface, said blastheads disposed above and below said bearing surface, and, said bearing support including an endless belt conveyor wherein an upper run of said belt conveyor serves as said bending mould and said transfer conveyor, said belt conveyor comprising a plurality of parallel belt strips wherein each belt strip is carried by one of a plurality of separate support bodies, each of said plurality of separate support bodies being pivotally adjustable relative to each other for deforming said upper run to an arched configuration such that each of said plurality of separate support bodies is inclined relative to an adjacent support body after pivotal adjustment, said support bodies also being pivotally adjustable relative to each other such that a lower run of each belt strip pivots away from an adjacent lower run in a lateral direction during the deforming of the upper run to said arched configuration.

6. An apparatus as set forth in claim 5, further including slide bars that support the upper run and that are each connected to one of said plurality of separate support bodies, and are bendable in longitudinal direction.

7. An apparatus as set forth in claim 5, wherein side edges of said belt strips are provided with guide catches or extensions which, within the area of said upper run, are maintained at a constant distance from each other during the deforming of said bearing surface.

8. An apparatus as set forth in claim 5, wherein the surface of each belt strip includes successive flexible plates.

9. An apparatus as set forth in claim 8, wherein the flexible plates are connected to each other with a chain.

10. An apparatus as set forth in claim 5, wherein each of said plurality of separate support bodies are pivotable relative to each other through a selectable degree of turning.

11. An apparatus as set forth in claim 5, wherein said chilling air blastheads are connected to said plurality of separate support bodies so as to be pivotable therewith.

12. An apparatus as set forth in claim 5, wherein said press surface is disposed above said belt conveyor and is fabricated from flexible plates, said press surface being stationary in the glass advancing direction and being movable in a vertical direction relative to said belt conveyor for gently pressing a glass sheet on a concave side.

13. An apparatus as set forth in claim 5, wherein the overhead blastheads are connected to said plurality of separate support bodies so as to follow the pivoting of the separate support bodies of said belt strips.

14. An apparatus as set forth in claim 5, wherein the upper run of the belt conveyor is bendable to a first curvature around a bending axis extending in an advancing direction of said glass sheet, and is bendable to a second curvature around a bending axis extending in a direction transverse to the advancing direction, said first curvature having a smaller radius of curvature than a radius of curvature of said second curvature.

15. An apparatus as set forth in claim 7, wherein the flexible plates include fiber braidings, said fiber braidings being located on a top surface of each flexible plate so as to maintain the glass sheet off said top surface of said plates at least during a chilling operation.

16. An apparatus as set forth in claim 8, wherein each of said plurality of support bodies is pivotally linked to an adjacent support body such that an axis of rotation between the support bodies will be located substantially flush with said bearing surface.

17. An apparatus as set forth in claim 8, wherein each of said plurality of support bodies is linked to an adjacent support body by two rotatable eccentric links.

18. An apparatus as set forth in claim 8, wherein each of said plurality of parallel belt strips are laterally pivotable to an angle relative to each other such that upstream and downstream ends of at least two adjacent belt strips are located at different distances from each other.

19. A glass bending and tempering apparatus comprising:
a bending and tempering section having an upstream end for receiving a heated glass sheet and a downstream end for exiting a heated glass sheet;
a deformable glass support means disposed substantially horizontally within said bending and tempering section, a center location of said upstream end and a center location of said downstream end being substantially fixed in a vertical direction, at least a portion of said support means being deformable from a flat configuration to a configuration curved around both a first axis extending between said center locations and a second axis extending substantially transversely to said first axis, said support means remaining substantially fixed at said center locations of said upstream and downstream ends during deformation, said support means comprising a plurality of conveying segments that are pivotally adjustable relative to each other to deform said support means around said first axis, said conveying segments being inclined relative to each other after pivotal adjustment; and,
a first means for quenching a glass sheet in said bending and tempering section, said first means for quenching being conformable to a curvature of said support means during deformation of said support means.

20. An apparatus as set forth in claim 19, wherein said apparatus further comprises a second means for quenching disposed above said support means that is deformable into a configuration that conforms with the curvature of said support means.

21. An apparatus as set forth in claim 19, wherein said first means for quenching includes blowing means that are movable with said support means during deformation.

22. An apparatus as set forth in claim 19, wherein said plurality of conveying segments are connected together by linkage arms.

23. An apparatus as set forth in claim 20, wherein said second means for quenching is arranged to be raised and lowered as a whole such that said second means for quenching is configured to conform with the curvature of said support means when said second means for quenching is in a lowered position.

24. An apparatus as set forth in claim 19, wherein a portion of said first means for quenching are pivotably mounted below a glass bearing surface of said support means.

25. An apparatus as set forth in claim 19, wherein said plurality of conveying segments form a conveyor belt for conveying said glass sheet within said bending and tempering section.

26. An apparatus as set forth in claim 25, wherein each of said conveying segments includes a support body, each support body having a belt strip, said conveying segments being positioned substantially parallel to each other.

27. An apparatus as set forth in claim 26, wherein each of said belt strips on each of said support bodies are supported by a slide bar, said slide bar being bendable such that at least a portion of said support means is curvable around said second axis.

28. A method of bending a glass sheet to be tempered, comprising the steps of:
heating a glass sheet for bending and tempering;
transporting said heated glass sheet to a deformable glass support means situated within a bending and tempering section such that said heated glass sheet is positioned between an upstream end and a downstream end of said bending and tempering section, said support means including a plurality of pivotally adjustable conveying segments for deforming said support means around a first axis extending between a center location of said upstream end and a center location of said downstream end wherein each of said conveying segments is inclined to an adjacent segment after pivotal adjustment;

retaining said deformable glass support means in a substantially fixed manner in a vertical direction at said center location of said upstream end and said center location of said downstream end;

deforming said support means such that at least a portion of said support means is curved around both said first axis extending between said center locations and a second axis extending substantially transverse to said first axis;

quenching said glass sheet with cooling air from air outlets; and, moving said air outlets so as to be generally conformable to a curvature of said support means during deformation of said support means.

29. A method as set forth in claim 28, further comprising the step of exposing an upper surface of said glass sheet to pressure so that of said glass sheet follows a curvature of said support means.

30. A method as set forth in claim 28, further comprising the step of oscillating said glass sheet during said curving.

* * * * *